US008255332B1

(12) United States Patent
Savage

(10) Patent No.: US 8,255,332 B1

(45) Date of Patent: Aug. 28, 2012

(54) UTILIZATION AND DISTRIBUTION OF STOCHASTIC DATA

(75) Inventor: Sam L. Savage, Palo Alto, CA (US)

(73) Assignee: Sam L. Savage, Palo Alto, CA (US)

(*) Notice: Subject to any disclaimer, the term of this patent is extended or adjusted under 35 U.S.C. 154(b) by 1391 days.

(21) Appl. No.: 11/346,071

(22) Filed: Feb. 2, 2006

Related U.S. Application Data

(63) Continuation-in-part of application No. 11/168,621, filed on Jun. 27, 2005, now abandoned.

(51) Int. Cl.
*G06F 21/00* (2006.01)

(52) U.S. Cl. .................................. 705/50; 705/4; 705/38

(58) Field of Classification Search ................. 705/7, 50
See application file for complete search history.

(56) References Cited

U.S. PATENT DOCUMENTS 6,353,815 B1 3/2002 Vilim et al.
2003/0078878 A1* 4/2003 Opsahl-Ong .................. 705/38
2003/0187703 A1* 10/2003 Bonissone et al. ................ 705/4
2004/0167893 A1* 8/2004 Matsunaga et al. ............... 707/6
2005/0004833 A1* 1/2005 McRae et al. ................... 705/11

OTHER PUBLICATIONS

David Becker, New Office Locks Down Documents, CNET News, Sep. 2, 2003, pp. 1-4.

* cited by examiner

*Primary Examiner* — Charles C Agwumezie
(74) *Attorney, Agent, or Firm* — Steptoe & Johnson LLP

(57) ABSTRACT

A certified distribution stored on a computer-readable medium for use in a stochastic information system includes stochastic data providing a series of trials for at least one uncertain variable such that the series of trials maintains the relationship between the trials of each of the at least one uncertain variable, and a digital imprimatur associated with the stochastic data to certify the stochastic data. A distribution database includes a database stored on a computer-readable medium and a communications interface operable to receive a database query, to determine a result set of the at least one stochastic models satisfying the database query, and to respond to the database query. The database includes at least one stochastic model providing a series of trials for at least one uncertain variable such that the series of trials maintains the relationship between the trials of each of the at least one uncertain variable.

2 Claims, 8 Drawing Sheets

100

Interactive Calculation Engine 104

Input Variable 114

Data Store 102

User Interface 106

Coherent Distribution Model 108

First Distribution Model 110

Second Distribution Model 112

| Week 0 | Week 1 | Week 2 | Week 3 | Week 4 | Week 5 | Week 6 | Week 7 | Week 8 | Week 9 | Week 10 | Week 11 | Week 12 |
|---|---|---|---|---|---|---|---|---|---|---|---|---|
| 85.00 | 84.60 | 85.71 | 86.70 | 84.63 | 85.25 | 84.57 | 84.81 | 85.13 | 85.10 | 79.96 | 80.37 | 79.73 |
| 85.00 | 85.62 | 85.17 | 83.36 | 85.62 | 83.33 | 78.33 | 81.66 | 81.06 | 80.09 | 79.96 | 79.84 | 78.35 |
| 85.00 | 87.36 | 84.00 | 83.56 | 81.68 | 86.52 | 89.56 | 88.01 | 92.35 | 93.44 | 89.92 | 85.89 | 83.27 |
| 85.00 | 82.56 | 78.41 | 76.59 | 77.24 | 77.28 | 78.02 | 76.54 | 75.92 | 81.41 | 83.40 | 83.14 | 81.75 |
| 85.00 | 80.80 | 78.45 | 78.22 | 78.05 | 77.13 | 79.08 | 74.73 | 77.70 | 80.13 | 84.95 | 85.68 | 82.95 |
| 85.00 | 83.72 | 81.59 | 79.40 | 85.18 | 88.86 | 90.72 | 91.09 | 92.84 | 88.67 | 90.89 | 91.43 | 87.78 |
| 85.00 | 88.73 | 86.41 | 87.13 | 85.18 | 83.12 | 82.18 | 86.43 | 89.59 | 92.62 | 91.76 | 96.13 | 96.86 |
| 85.00 | 81.10 | 84.36 | 80.53 | 85.21 | 87.18 | 93.55 | 89.82 | 88.81 | 89.39 | 84.03 | 85.56 | 84.31 |
| 85.00 | 87.30 | 89.43 | 86.59 | 84.69 | 81.48 | 82.39 | 78.53 | 77.85 | 75.91 | 74.97 | 77.15 | 75.39 |
| 85.00 | 83.11 | 81.96 | 81.64 | 80.04 | 77.55 | 74.05 | 78.49 | 77.94 | 75.38 | 76.18 | 75.51 | 75.05 |

FIG. 7A

| Monte Carlo Trials | Project 1 | Project 2 | Project 3 | Project 4 | Wind 1 | Wind 2 |
|---|---|---|---|---|---|---|
| Trial 1 | 0.70 | 0.25 | 0.13 | 0.03 | 0.80 | 0.93 |
| Trial 2 | 0.99 | 0.32 | 0.35 | 0.08 | 0.64 | 0.15 |
| : | : | : | : | : | : | : |
| : | : | : | : | : | : | : |
| Trial 1000 | 0.99 | 0.18 | 0.51 | 0.68 | 0.15 | 0.61 |

UTILIZATION AND DISTRIBUTION OF STOCHASTIC DATA

CROSS-REFERENCE TO RELATED APPLICATION

This application is a continuation-in-part of U.S. application Ser. No. 11/168,621 titled "STOCHASTIC INFORMATION SYSTEM" and filed Jun. 27, 2005, now abandoned which is hereby incorporated by reference in its entirety for all purposes.

TECHNICAL FIELD

This disclosure relates generally to risk analysis systems and, more particularly, to the dissemination and utilization of stochastic data in risk analysis systems.

BACKGROUND

In business, there is an old saying long-heeded by many successful executives: "no risk, no reward." Though somewhat cliché, this aphorism identifies risk as an important factor in making business decisions. Every business decision entails some degree of risk and, in most situations, this risk is typically evaluated subjectively based on knowledge, experience, perception, and intuition. For example, a small business is confronted with risk whenever the business hires, fires, buys, sells, or even opens its doors to the public. In many, if not most, situations, these risks are managed entirely by subjective analysis—managers rely on intuition refined by years of experience instead of performing systematic objective analysis.

So long as intuition and subjective analysis work, systematic objective techniques may reduce efficiency, requiring unnecessary calculations, computation, and documentation to arrive at or near the same result. However, complex business decisions may be beyond the intuitive abilities of most managers. For example, a large international corporation engaged in a multitude of transactions may be subject to substantial risk of currency fluctuation. Consider an agreement to supply widgets to a customer at a price specified in one currency. If widget components are obtained at agreed upon prices in another currency and the widgets are assembled by employees paid in a third currency, then currency fluctuations could render the widget supply business unprofitable. However, once the risks of currency fluctuation are defined, steps may be taken to mitigate the risk. As complexity increases, business managers may use computational decision analysis systems for assistance.

A variety of commercial decision analysis systems are available for purchase including, for example, the following software applications: software applications including @Risk, Crystal Ball®, and XLSim®. The most common automated decision support approach is Monte Carlo simulation. Using Monte Carlo simulation, a model is created by identifying uncertain variables, assigning probability distributions to each uncertain variable, and by defining the relationship between output variables and the uncertain variables. Then, random values are generated based on the probability distributions. The resulting values then may be analyzed to determine likely outcomes.

The efficacy of a decision analysis system using simulation depends on the quality and accuracy of the model. A variety of design flaws can affect the predictive ability of the system, such as, for example, uncertain variables may depend on one another, skewing simulation results; relevant variables may be omitted; and distributions may be inaccurate. For maximum effectiveness, probability distributions need to be carefully crafted to ensure maximum predictive value and to ensure dependencies are fully represented. The skills of an experienced statistician would certainly be beneficial. Additionally, business managers may have an interest in swaying predicted outcomes for their own personal gain. It is desirable to provide decision analysis tools and techniques to alleviate these concerns.

SUMMARY

In one general aspect, a certified distribution stored on a computer-readable medium for use in a stochastic information system includes stochastic data providing a series of trials for at least one uncertain variable such that the series of trials maintains the relationship between the trials of each of the at least one uncertain variable, and a digital imprimatur, such as, for example, a digital signature, associated with the stochastic data to certify the stochastic data. The digital imprimatur may be applied by a designated corporate official of an organization to authorize use of the certified distribution throughout the organization.

In some implementations, each trial of the series of trials provided by the stochastic data includes a trial value for each of the at least one uncertain variables, the trial values selected to maintain the relationship between the at least one uncertain variable and the trial values usable to simulate one possible occurrence of the at least one uncertain variables. The series of trials provided by the stochastic data may be created using a stream of random values. Stochastic data may be represented using a series of trials such that each trial in the series is equally likely. Additionally, stochastic data may be represented using a series of trials such that one or more trials are more likely than another trial. When unequal likelihood trials are used in a certified distribution, the certified distribution may be augmented with information usable to determine the relative likelihood of each trial in the series of trials.

Additionally, a certified distribution may include stochastic data that models at least one uncertain variable through time, such as, for example, by including a series of trials for at least one uncertain variable at time $t_0$ and a series of trials for the at least one uncertain variable at time $t_1$.

In another general aspect, a distribution database includes a database stored on a computer-readable medium and a communications interface operable to receive a database query, to determine a result set of the at least one stochastic models satisfying the database query, and to respond to the database query. The database includes at least one stochastic model providing a series of trials for at least one uncertain variable such that the series of trials maintains the relationship between the trials of each of the at least one uncertain variable. The communications interface may be coupled to a data network.

In some implementations, a stochastic model in the database includes a digital imprimatur certifying the stochastic model, such as, for example, a digital signature. The digital imprimatur may be applied by a designated corporate official of an organization to authorize use of the stochastic model throughout the organization.

In another general aspect, a method performed on a computer system for distributing certified stochastic distributions includes receiving a request for a stochastic distribution corresponding to a set of at least one uncertain variables, querying a distribution database for stochastic distributions corresponding to the set of at least one uncertain variables to identify a stochastic distribution, and distributing the identified stochastic distribution satisfying the query from the distribution database in response to the received request. The stochastic distribution may be represented as a series of trials for the set of at least one uncertain variables such that the trials maintain the relationships between each variable in the set of at least one uncertain variables.

In some implementations, the method further includes employing a digital rights management technique to the identified stochastic distribution to protect rights in the identified stochastic distribution.

In another general aspect, a method for performing decision analysis in a business enterprise includes creating a model with an uncertain variable, associating the uncertain variable with a stochastic distribution promulgated by a probability officer (who is responsible for vetting and certifying stochastic distributions for the business enterprise), and executing the model using the stochastic distribution to identify and evaluate the likelihood of possible outcomes.

A model may be created by determining a set of output variables that includes at least one variable material to decision analysis, determining a set of input variables that may affect the set of output variables such that the input variables include at least one uncertain variable, and determining the functional relationship between the set of input variables and the set of output variables. In some implementations, the stochastic distribution includes a series of trials for at least one uncertain variable such that the series of trials maintains the relationship between the trials of each of the at least one uncertain variable.

The details of one or more implementations are set forth in the accompanying drawings and the description below. Other features and advantages will be apparent from the description and drawings, and from the claims.

DESCRIPTION OF DRAWINGS

FIGS. 7A and 7B show stochastic data representing the value of a stock in an exemplary stochastic information system using a time-dependent uncertain variable.

DETAILED DESCRIPTION

A stochastic information system 100 is an automated decision support system that uses statistical or probabilistic information to model uncertain variables. A stochastic information system 100 may be implemented as described in U.S. application Ser. No. 11/168,621 filed Jun. 27, 2005 and titled "Stochastic Information System", which is hereby incorporated by reference in its entirety for all purposes.

Figure 1:
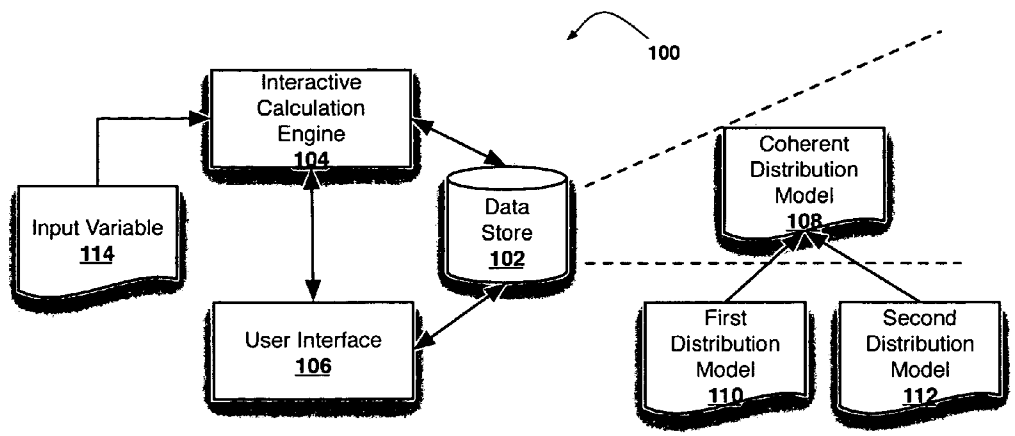
FIG. 1 is a block diagram of an exemplary stochastic information system.

Referring to FIG. 1, a stochastic information system 100 includes a data store 102, an interactive calculation engine 104, and a user interface 106. The data store 102 includes a coherent stochastic model 108 that includes stochastic information for a first uncertain variable and stochastic information for a second uncertain variable. The stochastic information for the uncertain variables may be created using a first distribution model 110 corresponding to the first uncertain variable, and a second distribution model 112 corresponding to the second uncertain variable. The interactive calculation engine 104 calculates a result by performing a simulation using calculation engine inputs, including: the coherent stochastic model 108, and an input variable 114. Finally, the user interface 106 is associated with the interactive calculation engine 104 and facilitates modification of the input variable 114 and display of the result, such that the result is automatically recalculated when the input variable 114 is modified. Each component may be implemented using any combination of the techniques described herein or any additional manner now known or later developed.

Figure 2:
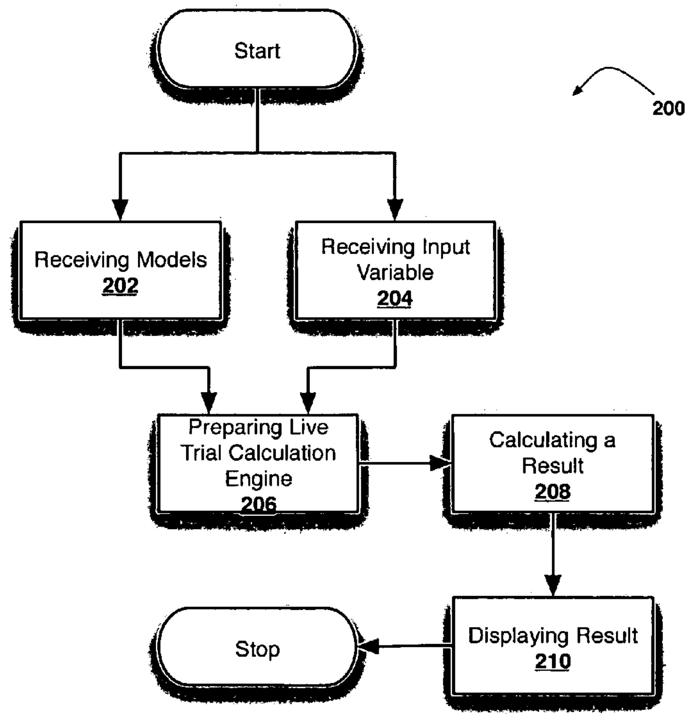
FIG. 2 is a flow chart of a method used in a stochastic information system.

Referring to FIG. 2, the stochastic information system 100 of FIG. 1 may be used to implement a method 200 that includes receiving models corresponding to uncertain variables (step 202), receiving a known input variable (step 204), preparing a live trial calculation engine using the received models and the known input variable (step 206), calculating a result using the live trial calculation engine (step 208), and displaying the result (step 210). The received models include one or more coherent stochastic models preserving the relationship between distribution models. Each step of the method 200 may be implemented using any combination of the techniques described herein or using any additional manner now known or later developed.

The techniques described herein build on the work of statisticians as well as management scientists, each of whom uses the term "model" in their writings. To a statistician, the term "model" may refer to one or more probability distributions associated with a random variable, defining possible outcomes as well as the likelihood of each outcome. Such a model may be used to calculate the expected value for the associated random variable or to generate a series of exemplary trials which may be used, for example, in a Monte Carlo simulation.

Alternatively, a management scientist may use the term "model" to refer to a spreadsheet model using formulas to allow exploration of various alternatives to assist in business decision-making. A management scientist may employ Monte Carlo simulation to calculate possible outcomes in a spreadsheet model. Throughout this document, we refer to the "term" model broadly as defined by the American Heritage Dictionary as "[a] schematic description of a system, theory, or phenomenon that accounts for its known or inferred properties and may be used for further study of its characteristics." *American Heritage Dictionary of the English Language*, Houghton Mifflin Company (2004). Thus, both uses of the term "model" fall within our definition.

Creating coherent distribution models 108 that have sufficient predictive ability is not an easy task. In fact, many companies rely on statisticians with advanced mathematical training and experience to operate their decision support systems because statisticians have the training and background to calculate dependencies between uncertain variables and to determine appropriate distributions.

Figure 3:
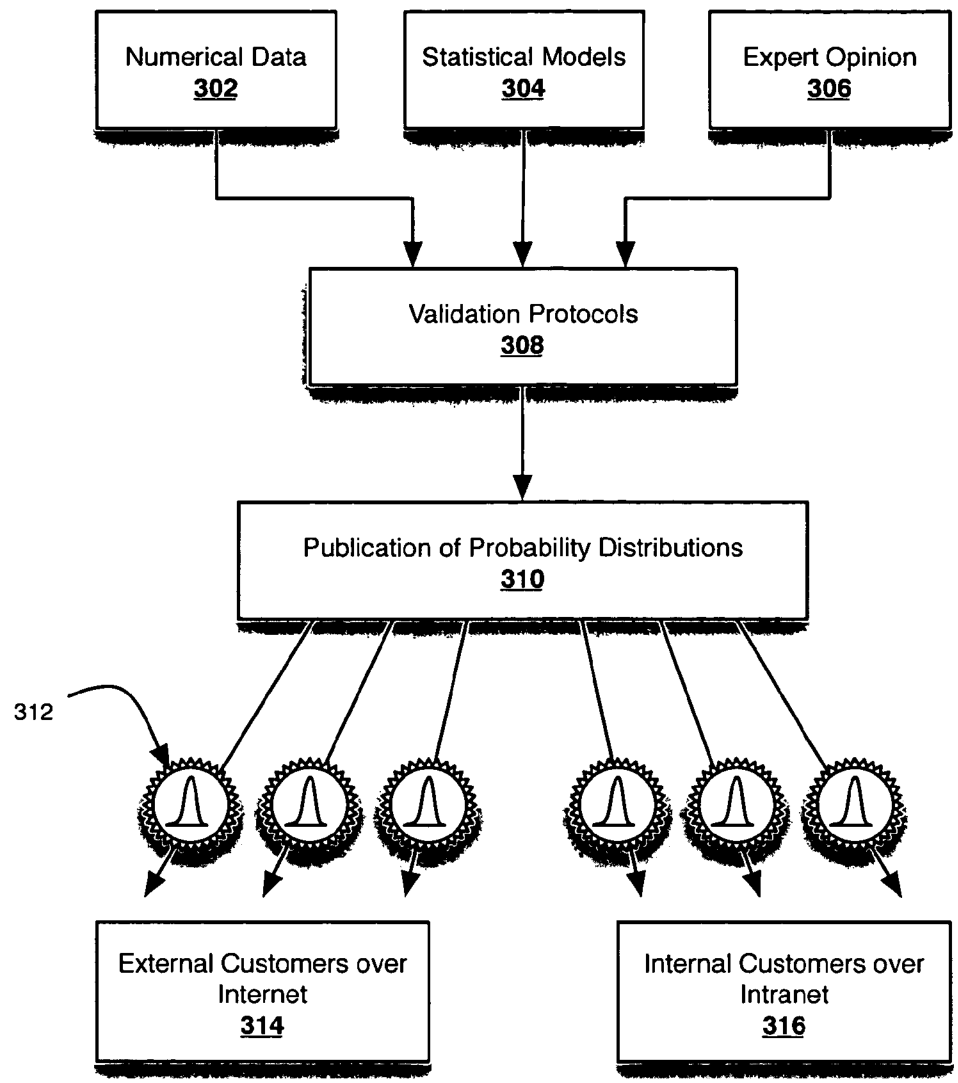
FIG. 3 is a data flow diagram depicting the validation and publication of distribution data.

Referring to FIG. 3, an expert may create and certify a distribution using numerical data 302, statistical methods 304, and expert opinion 306 to formulate a distribution 312. Once a distribution 312 has been prepared and validated, it may be published 310 for distribution to others, such as, for example, business managers. Published distributions 312 may be distributed both externally (314) and internally (316) to whoever may need to the uncertain variables represented by the distributions 312.

Figure 4:
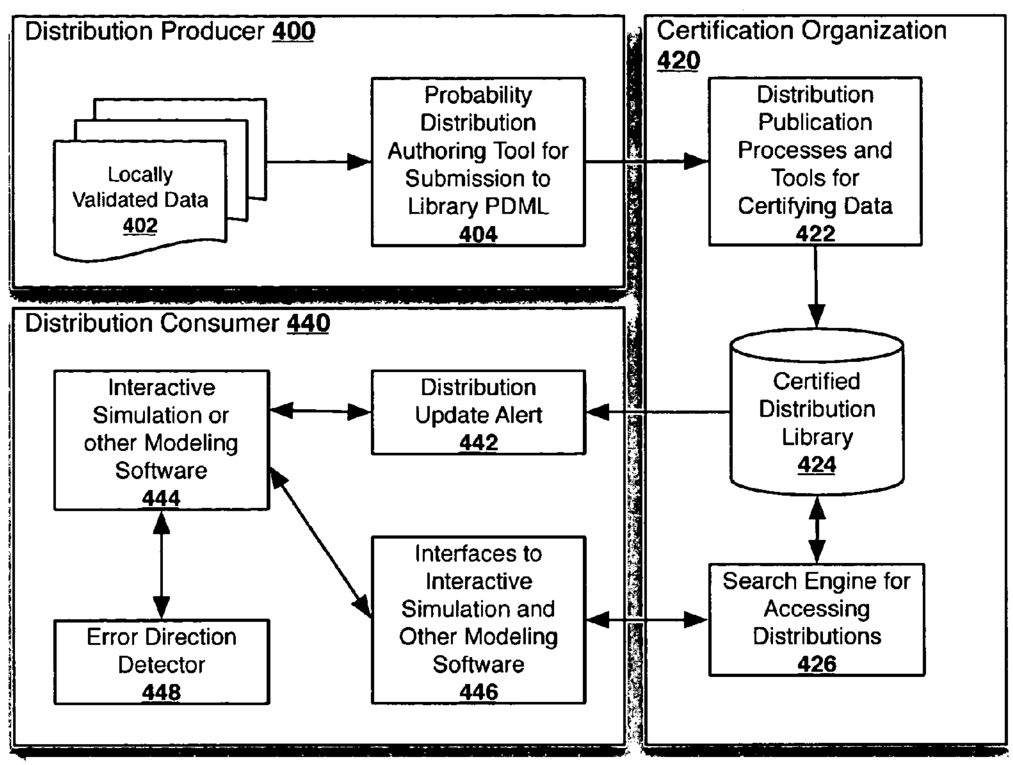
FIG. 4 is a block diagram of a stochastic information system.

Referring to FIG. 4, an implementation of a system for distributing stochastic information includes a distribution producer module 400, a certification organization module 420, and a distribution consumer module 440. The distribution producer module 400 may be used to create stochastic information and upload it to a certification organization module 420 for distribution to consumers. In one implementation, the distribution producer 400 includes a collection of locally validated data 402 (e.g., stochastic information collected and/or created by a user) and a probability distribution authoring tool 404 that may be used to submit stochastic information.

Submitted stochastic information is received by the certification organization module 420. In this implementation, stochastic information is represented using probability distribution mark-up language (PDML). A distribution publication process 422 receives the PDML-formatted stochastic information, performs whatever verifications are appropriate and useful, and stores the resulting data in a data store. In this case, the data store is a certified distribution library 424. When the certified distribution library 424 is updated, it may send a message to consumers alerting them of the update. In addition, the certification organization module 420 includes a search engine 426 for accessing distributions stored in the certified distribution library 424.

The distribution consumer module 440 provides a mechanism for accessing the certification organization module 420 and obtaining stochastic information that may be used in a decision support system. In this implementation, the distribution update alert 442 receives information from the certification organization module 420 when changes occur. This allows stochastic information used by an interactive simulation or other modeling software 444 to be updated. The interactive simulation software 444 uses an interface 446 to query the certification organization module 420 to retrieve desired stochastic information. Finally, an error direction detection 448 may be used with the interactive simulation 444 to identify problems, conflicts, dependencies, etc. with stochastic information being used.

Considered in more detail, PDML is an acronym for Probability Distribution Markup Language. Tools may be provided to enable an author or creator of a probability distribution to encode the distribution with relevant metadata. The metadata descriptors are described below. Appropriate metadata allows the system to check for statistical dependence relationships among all distributions in the certified distribution library 424 prior to adding a new distribution to the library. Once these checks are performed, the distribution can be certified, and an authenticity signature can be inserted.

Simulations, such as Monte Carlo simulations, rely on streams of random numbers to operate. In this implementation, the certified distribution library 424 stores stochastic information packets (SIPs) along with probability distributions. A SIP may take the form of a random number generator, a previously generated stream of random numbers, or a synthetic distribution.

On the one hand, the SIP may be a random number generator. This is the least practical as each random variable and each computer environment would require its own special implementation.

On the other hand, the SIP may be a previously generated stream of random numbers. Previously generated streams may be of two types. The first type is time independent, for typical Monte Carlo applications. These would be vectors of random variates available in multiple sizes, for example, 1000, 5000, 10,000, 100,000 variates. The second type may be time dependent for discrete event simulation and other time dependent simulations such as financial models in which an autocorrelated Consumer Price Index (CPI) is used. These would have an additional dimension for time periods. For example, to model 1,000 trials of the CPI over a 10-year period would require a matrix of dimension 10 by 1,000, in which each trial represents a possible 10-year trajectory of the CPI.

Irrespective of the type, the packets may be compressed and encrypted, and thus are as small as possible and may contain proprietary distributions, which may be used, but not easily reverse engineered by the end user. Each packet preferably has a header containing certification and other information about the random variable. The benefit of the pre-generated approach is that the SIPs may be generated by any means on any computer, and easily used on any other computer.

Alternatively, the SIP may be a synthetic distribution. Synthetic distributions may be manipulated to answer questions of the form: "for what distributions of demand should we proceed with this project?" The synthetic distributions may be input as histograms in which the user adjusts the heights of the bars.

The certified distribution library 424 also maintains Stochastic Library Units—Relationships Preserved (SLURPs). The certification organization module 420 should properly detect and model statistical relationships between SIPs, as well the temporal dependence of each SIP. For example, random number generator SLURPs could involve numerical methods, for example, Cholesky factorization, coupled to the F inverse method of random variate generation, or could involve structural models relating the variates. By way of further example, previously generated streams would again be time-independent or time-dependent, as described above. On the one hand, time-independent variates could be visualized as a matrix, with one column per variate and one row per sample. The rows would preserve the dependence between variables. On the other hand, time-dependent variates could be visualized as a three-dimensional array, with one dimension each for variate, samples, and time periods. Irrespective of type, the packets could be compressed and encrypted, and would have a header containing certification and other information about the library of the random variable. They would be sampled so as to preserve the statistical relationships between variates.

In some implementations, the following metadata is associated with each SIP and SLURP. The metadata preferably contains the following descriptors:

i. Unique Identifier ii. Key words describing distributions iii. Description iv. Variables specified in data v. Range of dates covered by data vi. Date numbers were generated vii. Name of creator of distribution viii. Validation certificate ix. Usage restrictions x. Cost xi. Copyright information, if applicable xii. Pedigree tracing the history of "derivative" distributions.

For example, a new distribution can be derived from two existing distributions (SIP1 and SIP2) to create a third (SIP3). The pedigree descriptors found in the newly created third distribution will include the names of the existing distributions and the model that used those distributions to create the third. This facility provides an audit trail for stochastic models, which is generally not available on current systems.

If SIP1 or SIP2 were also derivative distributions, that information would also be inherited by SIP3.

Referring again to FIG. 4, the stochastic information system further includes the search engine 426 to enable users to find distributions relevant to their needs. The search can be based on criteria such as specific variables (e.g., oil price), industry (e.g., oil industry), date range, source (e.g., Department of Commerce) or combinations of the above.

In this implementation, the interfaces 446 comprise PDML interpreters within spreadsheets and other applications that can receive and transmit SIPs and SLURPs. These would decrypt the data and verify the certification. On the one hand, random number generation interpreters create the appropriate set of random number generators in the host environment. On the other hand, with the previously generated data, resampling could be used to generate the random variates, or the data might simply be run sequentially through the model. In either case, the results are subject to the random number seed of the host environment. Thus, certified probability distributions could be added to existing @RISK, Crystal Ball®, or XLSim® models, subject to the caveat that the user would need to address the statistical relationships of his or her own random number generators with those delivered by the stochastic information system. The user would preferably be prompted when this is required.

Figure 5:
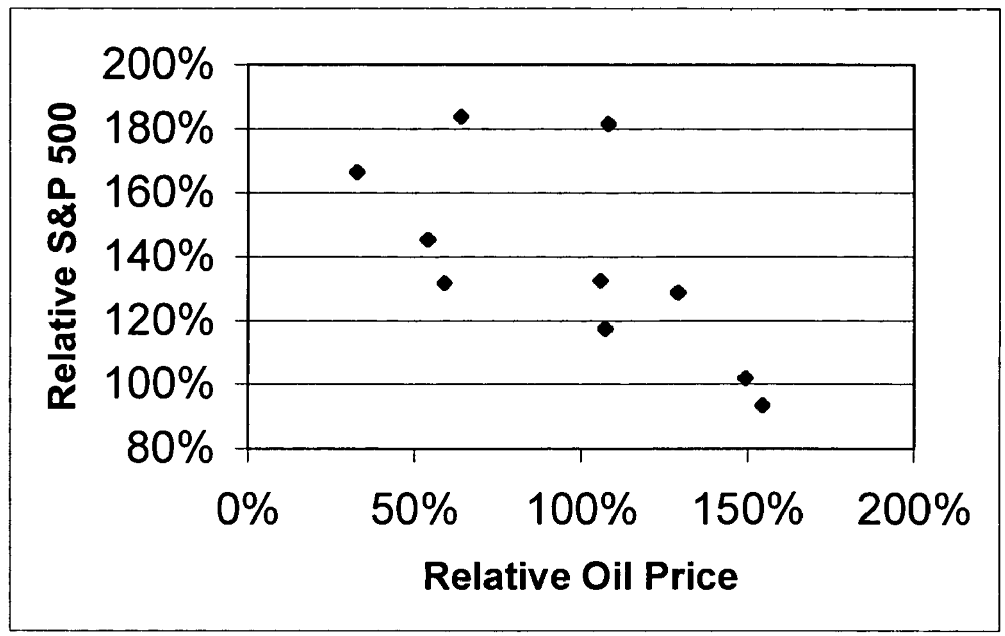
FIG. 5 is a scatter plot of stochastic data that preserves the relationship between relative oil prices and relative S&P 500 indexes.

Referring to FIG. 5, a specific implementation of the stochastic information system may be used to facilitate the analysis of risks, rewards, and expected returns of several different business ventures that depend on two uncertain variables: the price of oil, and the S&P 500 index. To analyze data using these uncertain variables in the stochastic information system, a business analyst may use a coherent stochastic model that preserves the relationship between the variables.

A coherent stochastic model may be created using stochastic information regarding oil prices and the S&P 500 index. Because there is some statistical relationship between these uncertain variables, it is important that they be modeled coherently. To do this, stochastic information is generated for each variable while taking the value of the other variable into account. Table 1 shows stochastic information including 10 hypothetical trials for each of the uncertain variables. This data should be created coherently such that the relationships between the stochastic information for oil prices and S&P 500 indexes is preserved. In this example, each pair of data corresponding to a trial preserves the relationship between the two variables. For example, the pair for trial 1 (106% oil price, 133% S&P 500) preserves the relationship between oil prices and the S&P 500. FIG. 5 is a scatter plot of the data shown in Table 1, illustrating the relationship, which indicates that high oil prices tend to reduce the level of the S&P 500.

TABLE 1

| Trials | Oil Price | SP500 |
|---|---|---|
| 1 | 106% | 133% |
| 2 | 108% | 182% |
| 3 | 129% | 129% |
| 4 | 155% | 94% |
| 5 | 54% | 145% |
| 6 | 64% | 184% |
| 7 | 107% | 117% |
| 8 | 149% | 102% |
| 9 | 33% | 167% |
| 10 | 59% | 132% |

In the previous example, the relationship between Oil Price and the S&P 500 could have been described using the common statistical measure known as correlation. However, the techniques described herein also may be used in a stochastic information system to preserve the relationships that cannot be defined using correlation.

Figure 6:
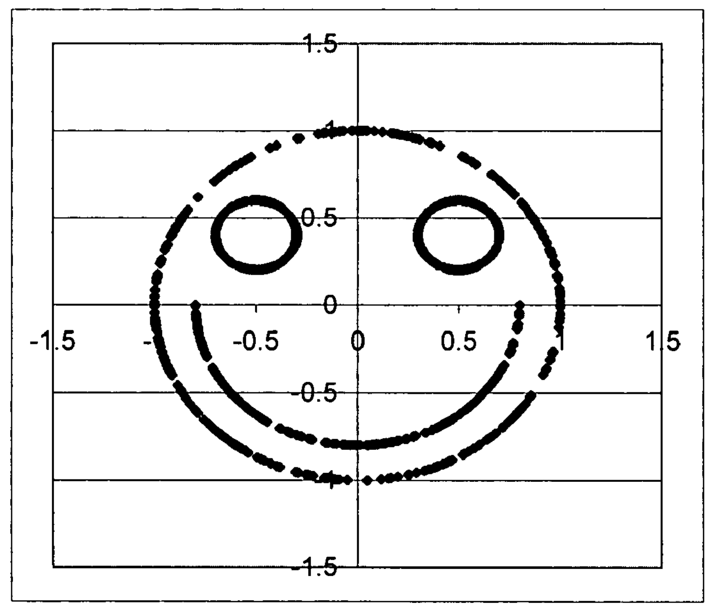
FIG. 6 is a scatter plot of stochastic data that preserves the relationship between two uncertain variables with little or no statistical correlation.

Referring to FIG. 6, Table 2 shows a subset of X and Y data stored in a spreadsheet for which the correlation is 0.031, which is considered to be low. In spite of the low correlation, the data stored in Table 2 is a coherent data set displaying a strong relationship when viewed as a scatter plot as shown in FIG. 6. By packaging 1000 trials as a SLURP, any user may use the variables X and Y in a stochastic information system even though they may not understand or be able to themselves model the relationship between X and Y. Additionally, the SLURP affords consistent, reproducible analysis based on the uncertain variables X and Y.

TABLE 2

| Trials | X | Y |
|---|---|---|
| 1 | 0.3057475 | 0.4476022 |
| 2 | 0.0417314 | 0.999189 |
| 3 | 0.2494753 | −0.968381 |
| 4 | .3003011 | 0.3890303 |
| 5 | −0.30335 | 0.3635489 |
| 6 | 0.284404 | −0.78793 |
| 7 | −0.30055 | 0.4148157 |
| 8 | 0.8575292 | −0.514435 |
| 9 | −0.666407 | −0.745588 |
| 10 | 0.6886552 | 0.4664018 |
| | . . . | . . . |
| 1000 | −0.049785 | −0.99876 |

Figure 7B:
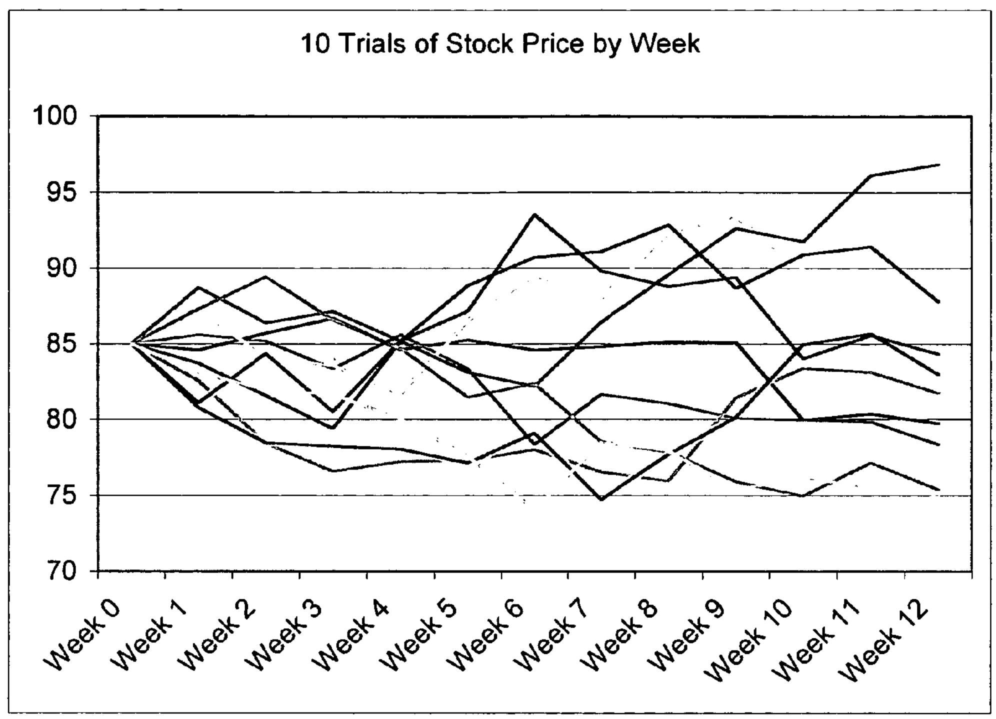

Referring to FIGS. 7A and 7B, a stochastic information system also may be used to model time-dependent uncertain variables. Consider, for example, the price of a stock that varies according to a random walk model. The price of the stock in any time period depends on the price in the previous time period. A single uncertain variable may be modeled using the techniques described herein by simulating various trials over a period of time and using the results of each trial to form the stochastic data corresponding to the uncertain stock price.

In this example, a series of trials are performed assuming an initial stock price of $85.00 as shown in FIG. 7A. Each trial is represented as a row of twelve values in addition to the initial stock price, with each value representing the stock price at a particular point in time. Each value in a trial is obtained by simulating a random walk with each price in any time period depending on the price in the previous time period. For purposes of explanation, only 10 trials (or trajectories) are shown in FIG. 7A; however, any number of trials may be used, such as, for example, 1,000 trials. FIG. 7B is a graphical representation of the trials shown in FIG. 7A.

FIGS. 7A and 7B represent stochastic data corresponding to an uncertain stock price variable. Consider, for example, a stochastic information system used to evaluate the risk and expected value of a derivative instrument whose value depends on the uncertain stock price variable of FIG. 7A, such as, for example, a European Put Option with a maturity of 12 weeks with a strike price of $82.00. The value of the European Put Option is $0.00 if the underlying stock price is equal to or greater than the $82.00 strike price. If the underlying stock price falls below $82.00, then the value of the European Put Option is $82.00 less the stock price. This relationship can be expressed as a structural model, =IF(Final Price<Strike then Strike−Final Price else 0, which is calculated for each trial. In this stochastic information system, the model is created by placing the data shown in FIG. 7A in a spreadsheet application and augmenting the data with an additional column, implementing the structural model. The following table shows the additional column.

TABLE 3

| Trial | 12 Week Put | Stock Price Week 12 |
|---|---|---|
| 1 | 2.266 | 79.734 |
| 2 | 3.655 | 78.345 |
| 3 | 0 | 83.27 |
| 4 | 0.252 | 81.748 |
| 5 | 0 | 82.954 |
| 6 | 0 | 87.783 |
| 7 | 0 | 96.856 |
| 8 | 0 | 84.305 |
| 9 | 6.61 | 75.390 |
| 10 | 6.95 | 75.049 |

Figure 8:
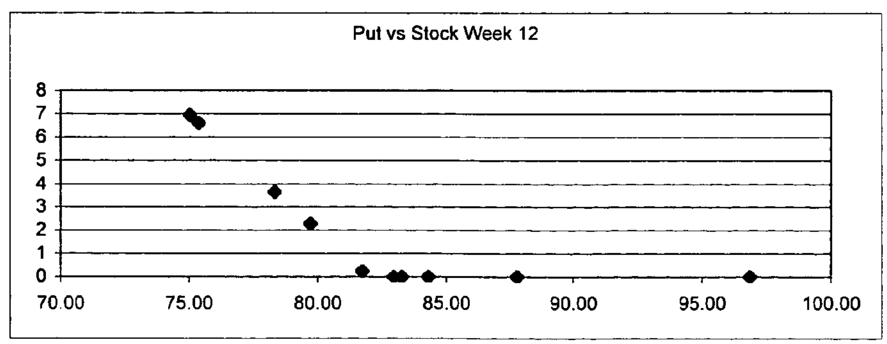
FIG. 8 is a scatter plot of stochastic data applied to a structural model in an exemplary stochastic information system representing the value of put options versus the uncertain value of an underlying stock.

FIG. 8 shows the value of the European Put Option versus the value of the underlying stock at week 12. A stochastic information system incorporating stochastic data and structural models such as that shown above may be used to facilitate the analysis and evaluation of risks and potential returns in a consistent manner by all those using the same stochastic data for all uncertain variables (in this case, stock price).

Once stochastic information has been created that preserves this relationship, it may be packaged for distribution within an organization or published and sold to others. By packaging stochastic information coherently, a business analyst may use the stochastic information system without fully understanding the relationships between uncertain variables.

The examples discussed above assume an equal probability for each trial. In other words, if there are 1000 trials, then each trial is considered just as likely as the others. In many situations, this is more than adequate; however, consider a distribution where the chance of an event happening is 0.1%. If only 1000 trials are used, there is a decent chance that such an event may not even be represented at all. If the occurrence of this event has a great impact, then the model could entirely fail to capture the real risk profile.

In such a situation, it may be useful to employ a technique sometimes referred to as importance sampling. When using importance sampling, each trial is not weighted equally. For example, in the case of a catastrophic event happening 0.1% of the time, 100 of 1000 trials could represent the case when the even occurs and the remaining 900 trials could represent the case where the event does not occur. Metadata may be added to the stochastic information such that a system using the model may appropriately weight the results. In other words, the 1000 trials over-represent the occurrence of the catastrophic event by a factor of 100, so any use of such trials should be adjusted to account for this difference. Additionally, the 1000 trials under-represent the non-occurrence of the catastrophic event and the use of the 900 trials in this category should be augmented accordingly.

Figure 9A:
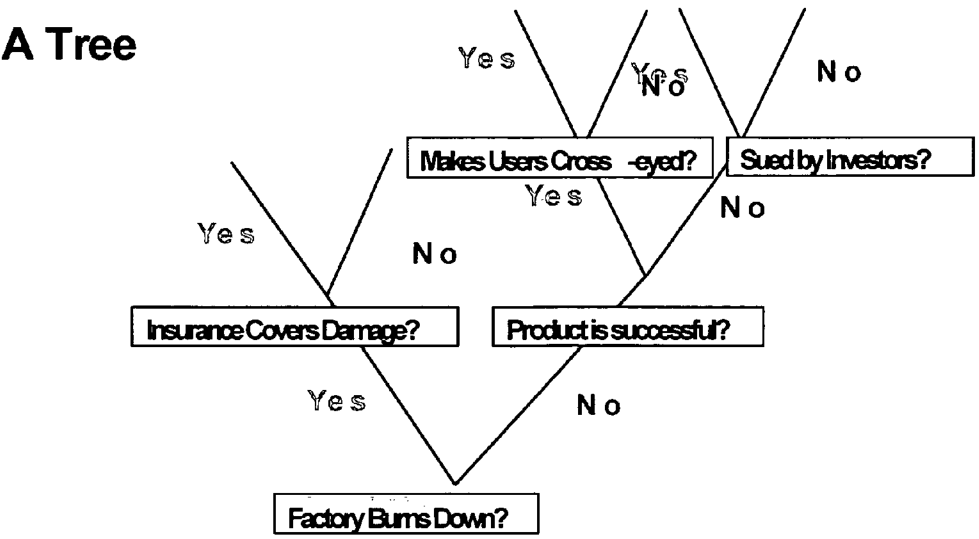
FIGS. 9A, 9B, and 9C are diagrams showing the decision forest approach to the generation of stochastic information.
Figure 9B:
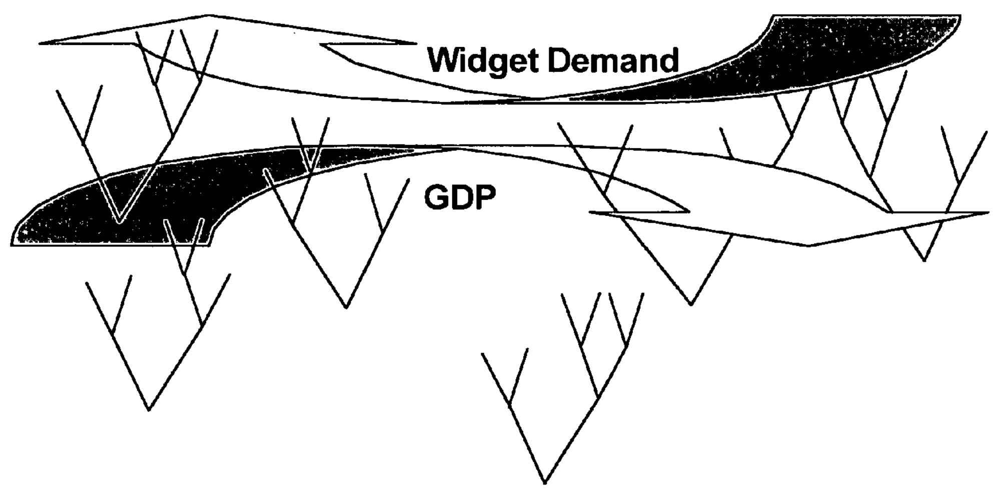

Referring to FIGS. 9A and 9B, organizations often face multiple "Local" uncertainties, such as the outcomes of individual investments or R&D projects, as well as "Global" uncertainties, such as economic factors, or the actions of competitors. The Decision Forest Method is a flexible and general method for creating a SLURP under certain conditions. By combining two currently widely used paradigms (decision trees and Monte Carlo simulation), it is easy for managers to conceptualize. Furthermore it leads to a convenient way to generate the SLURP itself. Local uncertainties may be modeled using a decision tree approach with global uncertainties modeled using Monte Carlo simulation. Combining individual trees and global uncertainties through Monte Carlo simulation ties the outcomes of the various trees together, resulting in a decision forest.

The method for generating a SLURP from the Decision Forest is described in the following example. There are two projects with N and M local independent outcomes respectively. We denote by $O_{1j}, j=1 \rightarrow N$ the possible outcomes of Project 1, which occur with probabilities $P_{1j}, j=1 \rightarrow N$ (which sum to 1) and $O_{2k}, k=1 \rightarrow M$, the possible outcomes of Project 2, which occur with probabilities $P_{2k}, k=1 \rightarrow M$ (which sum to 1). The probabilities in the two trees are assumed to be independent. To make the example more concrete, imagine that the two projects represent two independent pharmaceutical production plants producing the same drug, in which the outcomes represent uncertain quantities of the drug produced at each plant.

There is a single global uncertainty R, with probability distribution D(R), where the final economic measure of project i is modeled as $R^*O_i, i=1,2$. It is useful to imagine R as the uncertain price per unit of the drug. Clearly the economic outputs of the projects are related through R.

Typically decision tree software would model the expected or average value of trees such as these with a formula for each tree of the form (here shown for Project 1)

$$E(O_1)=\Sigma P_{1j}O_{1j}, j=1 \rightarrow N.$$

The Decision Forest method replaces this formula with $O_1=D_1$, a discrete random variable, which takes on the value $O_{1j}$, with probability $P_{1j}$, $j=1 \rightarrow N$.

Finally the joint distribution of the economic outcomes of both projects is simulated as follows:

a. Simulate a draw of R from P(R).

b. Make drawings of $D_1$ and $D_2$.

c. Output a row of the SLURP as $R^*D_1, R^*D_2$.

d. If more samples are needed, go to step a.

Figure 9C:
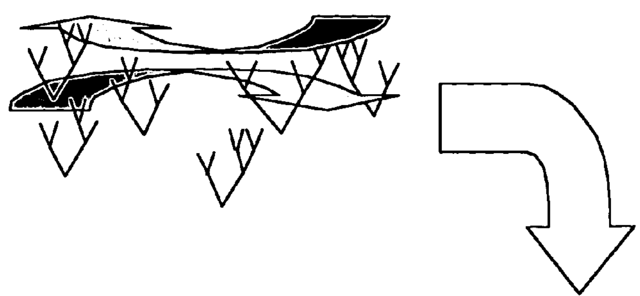

For example, the above technique may be used to generate the stochastic information shown in FIG. 9C.

The stochastic information systems described above describe stochastic data in a tabular format so that it may be easily implemented in a conventional spreadsheet. One skilled in the art will understand that stochastic data may be represented in any other form such that coherence is preserved, such as, for example, XML, PDML, HTML, or in a programming language data structure. In addition, stochastic data may become more complex as additional variables are added. For example, a three-dimensional data structure may be used to represent coherent trials of two variables wherein one or more of the variables is time-dependent.

The techniques discussed above allow a domain and/or technical expert, such as, for example, a statistician, economist, consultant, etc., to develop distributions corresponding to uncertain variables. Using domain expertise and technical expertise, the expert can model any dependencies and package the result for distribution to any consumer. To control distribution and use, any digital rights management techniques may be employed. For example, data may be encrypted, digitally signed, or otherwise modified to identify origination and/or to control distribution or use.

A number of implementations have been described. Nevertheless, it will be understood that various modifications may be made without departing from the spirit and scope of the invention. Accordingly, other implementations are within the scope of the following claims.

What is claimed is:

1. A method performed on a computer system for distributing certified stochastic distributions, the method comprising:

a computer system receiving a request for a stochastic distribution corresponding to a set of at least one uncertain variables;

the computer system querying a distribution database for stochastic distributions corresponding to the set of at least one uncertain variables to identify a stochastic distribution; and the computer system distributing the identified stochastic distribution satisfying the query from the distribution database in response to the received request, wherein the identified stochastic distribution from the distribution database includes a series of trials for the set of at least one uncertain variables such that the trials maintain the relationships between the trials of each variable in the set of at least one uncertain variables; and a digital imprimatur associating with the stochastic distributions to certify the stochastic distributions.

2. The method of claim 1 further comprising:

employing a digital rights management technique to the identified stochastic distribution to protect rights in the identified stochastic distribution.

* * * * *